United States Patent
Stingu et al.

(10) Patent No.: US 10,847,997 B1
(45) Date of Patent: Nov. 24, 2020

(54) WIRELESS POWER TRANSFER THROUGH LOW-E WINDOW

(71) Applicant: Spark Connected LLC, Dallas, TX (US)

(72) Inventors: Petru Emanuel Stingu, Dallas, TX (US); Kenneth Moore, Dallas, TX (US); Yulong Hou, Farmers Branch, TX (US); Ruwanga Dassanayake, Dallas, TX (US)

(73) Assignee: SPARK CONNECTED LLC, Dallas, TX (US)

( * ) Notice: Subject to any disclaimer, the term of this patent is extended or adjusted under 35 U.S.C. 154(b) by 11 days.

(21) Appl. No.: 16/435,228

(22) Filed: Jun. 7, 2019

(51) Int. Cl.
| | |
|---|---|
| *H02J 50/10* | (2016.01) |
| *H04B 5/00* | (2006.01) |
| *B32B 17/06* | (2006.01) |
| *H02J 7/02* | (2016.01) |
| *H04W 84/12* | (2009.01) |

(52) U.S. Cl.
CPC .............. *H02J 50/10* (2016.02); *B32B 17/06* (2013.01); *H04B 5/0037* (2013.01); *H04B 5/0081* (2013.01); *B32B 2255/205* (2013.01); *B32B 2419/00* (2013.01); *H02J 7/025* (2013.01); *H04W 84/12* (2013.01)

(58) Field of Classification Search
CPC .... H02J 7/025; H02J 7/00034; H02J 7/00041; H02J 7/00045; H02J 50/10; H02J 50/12; H02J 50/40; H02J 50/80; H02J 13/00022; H02J 13/00026; H04B 5/0037; H04B 5/0075; H04B 5/0093
See application file for complete search history.

(56) References Cited

U.S. PATENT DOCUMENTS

| | | | |
|---|---|---|---|
| 10,211,776 B2* | 2/2019 | Janowski | G02F 1/13306 |
| 10,374,170 B2* | 8/2019 | Parham | H01L 51/0061 |
| 2010/0033290 A1 | 2/2010 | Liu et al. | |
| 2014/0020312 A1* | 1/2014 | Seiling | H02S 40/38 |
| | | | 52/173.3 |
| 2019/0045676 A1 | 2/2019 | Lee et al. | |

OTHER PUBLICATIONS

Airfuel Alliance, "Is Wireless Power Transfer Safe?", Jan. 16, 2019, 14 pages.
Airfuel Alliance, "Frequency Choice", Oct. 25, 2018, 8 pages.
(Continued)

*Primary Examiner* — An T Luu
(74) *Attorney, Agent, or Firm* — Slater Matsil, LLP

(57) ABSTRACT

In an embodiment, a method for wirelessly transferring power through a low-e window includes: causing a first current to flow through a transmitter coil disposed in a first outer surface of the low-e window, the first current having a first frequency; inducing, with the first current, a second current to flow through a receiver coil disposed in a second outer surface of the low-e window, the low-e window having a metal or metal oxide layer having a first thickness; generating a voltage based on the second current; and powering an electronic device coupled to the receiver coil with the generated voltage, where the first frequency is associated with a first skin depth of the metal or metal oxide layer, and where the first skin depth is larger than the first thickness.

20 Claims, 4 Drawing Sheets

(56) References Cited

OTHER PUBLICATIONS

Kierantimberlake, "Investigating Low-E Coating Technology for Glass", Jan. 29, 2014, 3 pages.
Maxlinear, et al., "Wireless Power & Data Solution for 4G/LTE and 5G Millimeter Wave Fixed Wireless Access CPEs", Jan. 4, 2019, https://www.maxlinear.com/company/press-releases/2019/maxlinear,-zinwell-and-jjplus-announce-wireless-po, 2 pages.
Gromicko, N., "Low-E Windows", https://www.nachi.org/low-e-windows.htm, Apr. 23, 2019, 7 pages.
Vairamohan, B. et al., "What's New in Electrotechnolgoies for Industrial Process Heating?", ACEEE Summer Study on Energy Efficiency in Industry, Jun. 2011, pp. 1-156-1-164.
Vitro, Glass Technical Document, TD-131, "Design Considerations with Low-E Coated Glass", Oct. 4, 2016, 3 pages.

\* cited by examiner

PRIOR ART

WIRELESS POWER TRANSFER THROUGH LOW-E WINDOW

TECHNICAL FIELD

The present disclosure relates generally to an electronic system and method, and, in particular embodiments, to wireless power transfer through low-emissivity (low-e) window.

BACKGROUND

Windows are generally made of glass. The thermal emissivity of standard clear glass used in windows is typically very high, thereby causing heat to pass through the window. To improve thermal control (e.g., to improve thermal insulation), windows may be coated with a thin film of low-e coating to reduce the emission of radiant infrared light. Windows coated with low-e coating, also known as low-e windows, tend to keep heat on the side of the glass where the heat originated, while allowing light to pass through.

The coating used in low-e glass may be a thin metal layer or a thin metallic oxide layer that is incorporated in the glazing surface of the glass. For example, a pyrolytic coating is a low-e coating that uses tin oxide, together with additional materials. The tin oxide is deposited directly onto the glass surface during the glass manufacturing process while the glass is still hot. Sputtered coating is another type of low-e coating that includes at least one metal layer deposited on glass or plastic film.

FIG. 1 shows a low-e double-pane window. As shown in FIG. 1, argon (Ar) gas is enclosed between interior glass pane 104 and exterior glass pane 102 of a low-e window 100. Exterior glass pane 102 includes low-e layer 106. The low-e layer 106 includes metal or metal oxide.

SUMMARY

In accordance with an embodiment, a method for wirelessly transferring power through a low-e window includes: causing a first current to flow through a transmitter coil disposed in a first outer surface of the low-e window, the first current having a first frequency; inducing, with the first current, a second current to flow through a receiver coil disposed in a second outer surface of the low-e window, the low-e window having a metal or metal oxide layer having a first thickness; generating a voltage based on the second current; and powering an electronic device coupled to the receiver coil with the generated voltage, where the first frequency is associated with a first skin depth of the metal or metal oxide layer, and where the first skin depth is larger than the first thickness.

In accordance with an embodiment, a wireless power transmission system includes: a low-e window having a first pane, and a second pane opposite the first pane; a wireless power transmitter having a transmitter coil disposed in the first pane; and a wireless power receiver having a receiver coil disposed in the second pane. The second pane includes a metal or metal oxide layer of a first thickness. The wireless power transmitter is configured to wirelessly transfer power through the low-e window to induce a second current flowing through the receiver coil by causing a first current to flow through the transmitter coil at a first frequency, where the first frequency is associated with a first skin depth of the metal or metal oxide layer, and where the first skin depth is larger than the first thickness.

In accordance with an embodiment, a wireless power transmitter configured to be coupled to a low-e window that includes a metal or metal oxide layer having a first thickness, and a wireless power receiver having a receiver coil disposed in an outer surface of a second pane of the low-e window. The wireless power transmitter includes: a driver; and a transmitter coil coupled to the driver and configured to be disposed in an outer surface of a first pane of the low-e window. The wireless power transmitter is configured to transmit power to the wireless power receiver through the low-e window by causing the driver to induce a second current flowing through the receiver coil by generating a first current flowing through the transmitter coil, the first current having a first frequency, where the first frequency is associated with a first skin depth of the metal or metal oxide layer, and where the first skin depth is larger than the first thickness.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
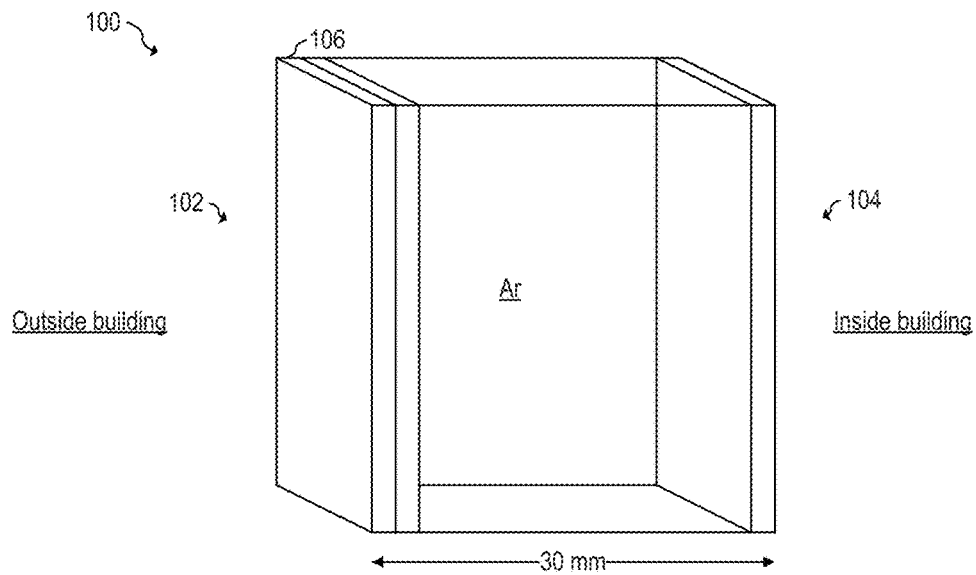
FIG. 1 shows a low-e double-pane window.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a system and method of wireless power transfer through a low-e window to power, e.g., a 5G cell. Embodiments of the present invention may be used in other application, such as to power other types of electronic devices, and through other mediums (different than low-e windows), such as other mediums having thin metal or metal oxide layers.

In an embodiment of the present invention, a wireless power transmitter transmits wireless power to a wireless power receiver through a low-e window that has a metal or metal oxide layer with an efficiency higher than 80% (e.g., higher than 85%, higher than 90%). Power dissipation is minimized in the metal or metal oxide layer by transmitting power through the metal or metal oxide layer at a frequency associated with a skin depth that is higher than the thickness of the metal or metal oxide layer. In some embodiments, the wireless power transmitter transmits more than 15 W, such as 20 W or 25 W, through the low-e window. In some embodiments, the low-e window is at least 30 mm thick.

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging.

Wireless charging standards allow for interoperability between different devices and manufacturers. Some wireless charging standards, such as the Qi standard from the Wireless Power Consortium, and standards promoted by the AirFuel alliance, are becoming widely adopted. The Qi standard uses inductive charging operating between 80 kHz and 300 kHz to wirelessly transmit power from a transmitter to a receiver. Standards promoted by the AirFuel alliance use resonant wireless charging operating at 6.78 MHz to wirelessly transmit power from a transmitter to a receiver.

There are various similarities between inductive and resonant wireless charging systems. For example, both, inductive and resonant wireless charging systems may be used to wirelessly transmit power from a transmitter to a receiver. Both systems use a transmitter coil and a receiver coil to wirelessly transmit power from the transmitter to the receiver.

However, there are various differences between inductive and resonant wireless charging systems. For example, as explained in a post published by the AirFuel alliance in www.airfuel.org/resources/is-wireless-power-transfer-safe/ and titled "Is Wireless Power Transfer Safe?," inductive wireless charging systems typically operate at frequencies much lower (e.g., 80 kHz to 300 kHz) than resonant wireless charging systems (e.g., 6.78 MHz). The quality factor (also known as Q) exhibited by resonant wireless charging systems is typically higher than the quality factor of inductive wireless charging systems. Inductive wireless charging systems typically operate with tight coupling between transmitter and receiver coils, where the transmitter and receiver coils have matching sizes. Inductive wireless charging systems therefore avoid exposing substantial electromagnetic fields, due, in part, by the close proximity between transmitter and receiver coils. In contrast, resonant wireless charging systems may operate without matching coil sizes (between transmitter and receiver coils) and may operate over a wide range of coupling, making resonant wireless charging systems suitable for transmitting wireless power over longer distances (e.g., 25 mm, 30 mm, or more) than inductive wireless charging systems, which typically are used to transmit power wirelessly over short distances, such as 5 mm or less.

Both, inductive and resonant wireless charging systems generate alternating magnetic fields. As explained in article titled "What's New in Electrotechnologies for Industrial Process Heating?," by Baskar Vairamohan, Ingrid Bran and Gabriel Meric de Bellefon, and published in ACEEE Summer Study on Energy Efficiency in Industry in 2011, alternating magnetic fields typically induce heat on metals exposed to such field, in a process known as electromagnetic induction. Electromagnetic induction produces heat in a nearby conductor, such as a metal, by applying a current with a frequency between 60 Hz and 800 kHz to an inductor coil in proximity with the metal. When the magnetic field generated by the coil intersects the metal, eddy currents are generated in the metal, which generates heat through the $I^2R$ effect.

To address the possibility of heating nearby metals, inductive wireless charging systems, such as inductive wireless charging systems that comply with the Qi standard, implement foreign object detection (FOD). Foreign object detection is the process in which metals within the wireless charging field of an inductive wireless charging system are detected. When a metal is detected near the transmitter of an inductive wireless charging system, the transmitter may be turned off, or the amount of power that is delivered by the transmitter may be reduced, e.g., to avoid safety hazards caused by heating the detected metal. As explained in a post published by the AirFuel alliance in http://www.airfuel.org/resources/is-wireless-power-transfer-safe/ and titled "Is Wireless Power Transfer Safe?," eddie current losses induced in nearby metal objects are reduced with the square root of the frequency increase. Therefore, metallic objects such as coins, washers, keys, etc., that would heat up in the 100 kHz to 300 kHz range are not heat up by a resonant wireless charging system operating at 6.78 MHz. In another post published by the AirFuel alliance in https://www.airfuel.org/resources/frequency-choice/ and titled "Frequency Choice," explains that the metal object heating caused by magnetic fields at 6.78 MHz is negligible compared to lower frequency wireless power.

A possible application for wireless charging is for charging a 5G cell through a wall or window of a building. For example, communication signals associated with 5G standards tend to degrade when traveling through low-e windows (e.g., due to the presence of metal or metal oxide layers). A 5G cell used for 5G communications (e.g., using the 5G NR wireless standard) may be placed outside the outer wall or outer surface of a low-e window of a building and in the line of sight from a 5G base station. The 5G cell may receive power wirelessly from a wireless power transmitter located inside the building, thereby avoiding drilling holes and wiring through the outer wall of the building.

Since low-e windows include a layer of metal or metal oxide, and since it is known that eddie currents losses induced in nearby metal objects are reduced with the square root of the frequency increase, the obvious choice for implementing a wireless charging system that is configured to transfer power wirelessly through a low-e window is to use high frequencies such as 6.78 MHz as opposed to low frequencies, such as 80 kHz to 300 kHz.

However, resonant wireless charging systems operating at 6.78 MHz exhibit poor performance (e.g., 50% efficiency or less) due, in part, to losses associated with the metal or metal oxide layer of the low-e window. For example, a 25 W resonant wireless power transmitter operating at 6.78 MHz may be capable of delivering only 5 W to a resonant wireless power receiver when the wireless power travels through a low-e window.

The inventors of this application realized that the generation of eddie currents in the metal or metal oxide layers of the low-e window may be minimized if the frequency of the electromagnetic wave traveling through the low-e window to transfer wireless power is selected to have a skin depth that is higher than the thickness of the metal or metal oxide layer of the low-e window.

Alternating electromagnetic waves interacting with a metal generate an alternating current. The density of the generated current is at a maximum at the surface and decreases with a depth into the metal. The depth at which the current density declines to 1/e of its surface value is known as the skin depth.

Figure 2:
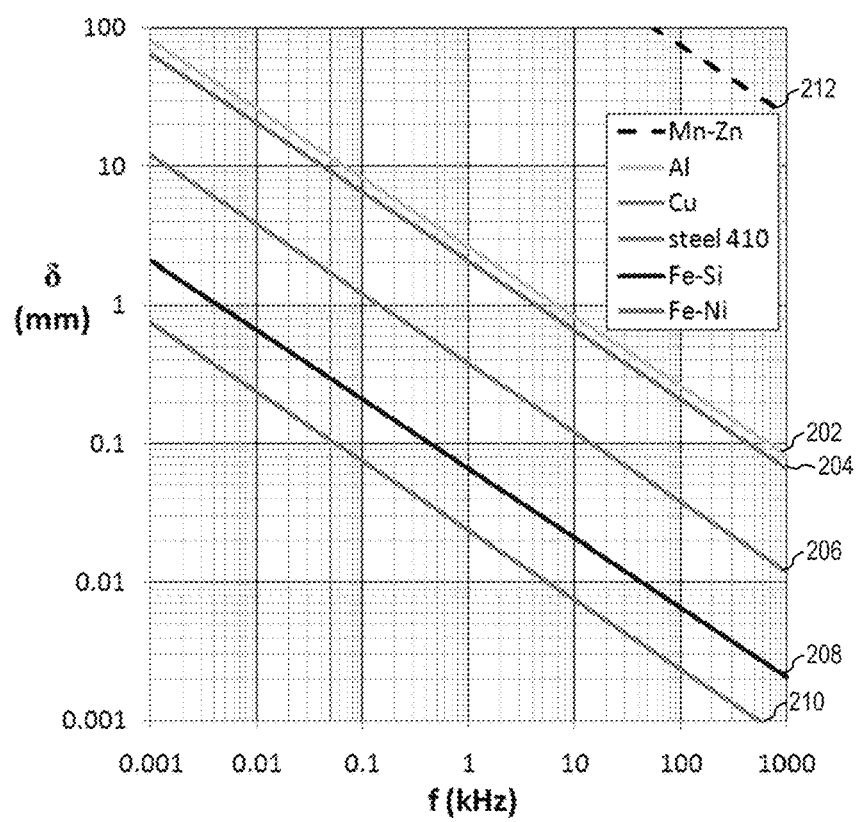
FIG. 2 shows a graph of the skin depths versus frequency for known materials.

Skin depth is a property of a material that varies with the frequency of the applied wave. FIG. 2 shows a graph of the skin depth δ versus frequency for known materials. Curve 202 shows the skin depth for aluminum (Al). Curve 204 shows the skin depth for copper (Cu). Curve 206 shows the skin depth for steel 410. Curve 208 shows the skin depth for ferrosilicon alloy (Fe—Si), Curve 210 shows the skin depth for iron-nickel clusters (Fe—Ni). Curve 212 shows the skin depth for manganese-zinc ferrite (Mn—Zn). As shown in FIG. 2, the skin depth tends to decrease when the frequency of the electromagnetic wave increases.

The metal or metal oxide layer of a typical low-e windows has a thickness in the order of 5 μm or lower, such as in the nanometer range. Since the skin depth for low-e materials, such as indium oxide, tin oxide, zinc oxide, gold layer systems, and silver layer systems, at frequencies, such as lower than 300 kHz is 35 μm or more, the generation of eddie currents when wirelessly transferring power through the low-e window at frequencies lower than 300 kHz are minimal.

Figure 3:
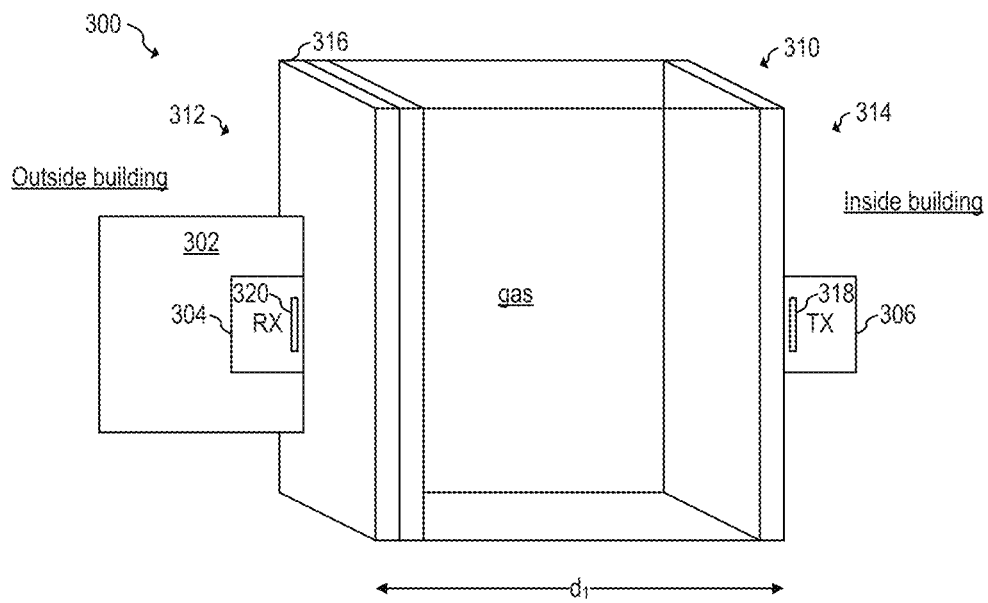
FIG. 3 shows a schematic diagram of a wireless power transmission system for powering a 5G cell through a low-e window, according to an embodiment of the present invention.

FIG. 3 shows a schematic diagram of wireless power transmission system 30o for powering 5G cell 302 through low-e window 310, according to an embodiment of the present invention. Wireless power transmission system 300 includes wireless power transmitter 306, and wireless power receiver 304. Wireless power transmitter 306 and wireless power receiver 304 are located in opposite sides of low-e window 310.

During normal operation, 5G cell 302 establishes a communication link with a base station (e.g., to provide access to the Internet). The 5G cell 302 is placed on the outside of low-e windows 310 to avoid the signal degradation that would occur if the signal travels through low-e window 310. The 5G cell 302 acts as a modem or router that sends and receives data to a device (such as another router) that is located inside the building (e.g., via WiFi). Using a 5G cell attached to the outer surface of a low-e window advantageously allows for the establishing of a communication link between the 5G cell and the base station without incurring signal degradation associated with millimeter-wave signals (5G signals) traveling through low-e windows.

Wireless power receiver 304 is an inductive wireless power receiver that may be attached to the outer surface of low-e window 310 and may be used to power κG cell 302. Other electronic devices, such as security cameras, audio systems, etc., may implement wireless power receiver 304 for receiving power through low-e window 310. In some embodiments, wireless power receiver 304 is attached to low-e window 310 using magnets. In other embodiments, wireless power receiver 304 is attached to low-e window 310 using adhesive.

Wireless power transmitter 306 is an inductive wireless power transmitter that may be attached to the inside surface of low-e window 310. In some embodiments, wireless power transmitter 306 may operate without FOD, e.g., to avoid detecting metal or metal oxide layer 316 as a foreign object and turning off the wireless power transmission. In some embodiments, wireless power transmitter 306 is attached to low-e window 310 using magnets. In other embodiments, wireless power transmitter 306 is attached to low-e window 310 using adhesive.

In some embodiments, wireless power transmitter 306 transmit power to wireless power receiver 304 in frequencies, e.g., between 80 kHz and 300 kHz, such as between 100 kHz and 148.5 kHz, for example. Other frequencies resulting in a skin depth higher than the thickness of metal or metal oxide layer 316 may also be used. In some embodiments, the frequencies used correspond to skin depths that are 1000 times higher than the thickness of metal or metal oxide layer 316. In some embodiments, the frequencies used correspond to skin depths that are 10000 times higher than the thickness of metal or metal oxide layer 316. Using frequencies corresponding to skin depths that are 1000 times thicker than the thickness of metal or metal oxide layer 316 may advantageously result in low losses during wireless power transmission.

In some embodiments, transmitter 306 includes a WiFi router that receives WiFi data from, e.g., 5G cell 302. In some embodiments, the router of transmitter 306 may be a main router. In other embodiments, the router of transmitter 306 may be a relay router that relays the data to a main router.

Low-e window 310 may be a double-pane low-e window or a triple-pane low-e window. Other types of low-e window may be used.

The low-e coating of low-e window 310 includes metal or metal-oxide layer 316. Although metal or metal oxide layer 316 is shown in FIG. 3 as the outermost layer of pane 312 of low-e window 310, in some embodiments, metal or metal oxide layer 316 may not be the outermost layer of pane 312. In some embodiments, multiple metal or metal oxide layers may be used. For example, in an embodiment, low-e window includes three silver layers separated by dielectric layers, where each silver layer is between 10-15 nm thick.

The gas used in low-e window 210 may be argon (Ar). Other types of gases may also be used.

Coil 320 of wireless power receiver 304, and coil 318 of wireless power transmitter 318 are separated by a distance $d_1$. In some embodiments, distance $d_1$ is 30 mm. In other embodiments, distance $d_1$ may be smaller than 30 mm, such as 29 mm, 25 mm, or lower, or higher than 30 mm, such as 31 mm, 35 mm, or higher.

Coils 318 and 320 may be, for example, using Litz wire. Other implementations are also possible. In some embodiments, coil 318 has an inductance between 8 μH and 16 μH, with an ESR between 20 mΩ and 50 mΩ at an operating frequency of 125 kHz. In some embodiments, coil 320 has an inductance between 32 μH and 80 μH, with an ESR between 100 mΩ and 300 mΩ at an operating frequency of 125 kHz. Using a transmitter coil with an inductances higher than 8 µH and a receiver coil with an inductance higher than 32 µH advantageously allows for the transfer of power levels greater than 15 W, such as 25 W or more, across a low-e window that has a thickness greater than 20 mm, such as 30 mm.

The inventors of this application also recognized that low-e coating causes a lowering of the quality factor for wireless power transfer and a shift of the resonance frequency. For example, FIG. 4 shows a graph of wireless power transfer versus frequency of with (curve 404) and without (curve 402) a low-e window between a wireless power transmitter and a wireless power receiver.

Figure 4:
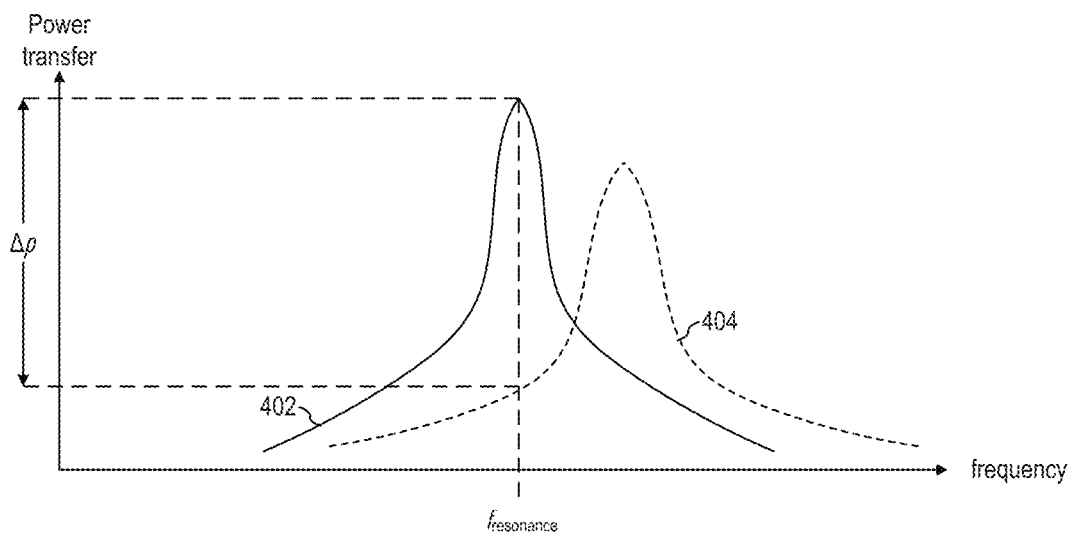
FIG. 4 shows a graph of wireless power transfer versus frequency of with and without a low-e window between a wireless power transmitter and a wireless power receiver.

As shown in FIG. 4, although wireless power transfer is maximized when operating the wireless charging system at resonance, even a small shift in the resonance frequency of the wireless power transfer system may cause a big change in the wireless power transferred. The magnitude of the resonance shift may not be known a priori and may dynamically vary, e.g., based on changes in the load coupled to the wireless power receiver, or environmental conditions, for example.

In an embodiments, the wireless power transmitter is operated at a frequency that is different from the resonance frequency of the wireless power transmission system. The operating frequency is determined during a calibration step. During the calibration step, the wireless power transmitter performs a frequency sweep and determines the voltage generated across a receiver coil of the wireless power receiver for each step of the frequency sweep. The frequency that produces the voltage across the receiver coil that is closest to a target voltage is selected and the operating frequency.

Figure 5:
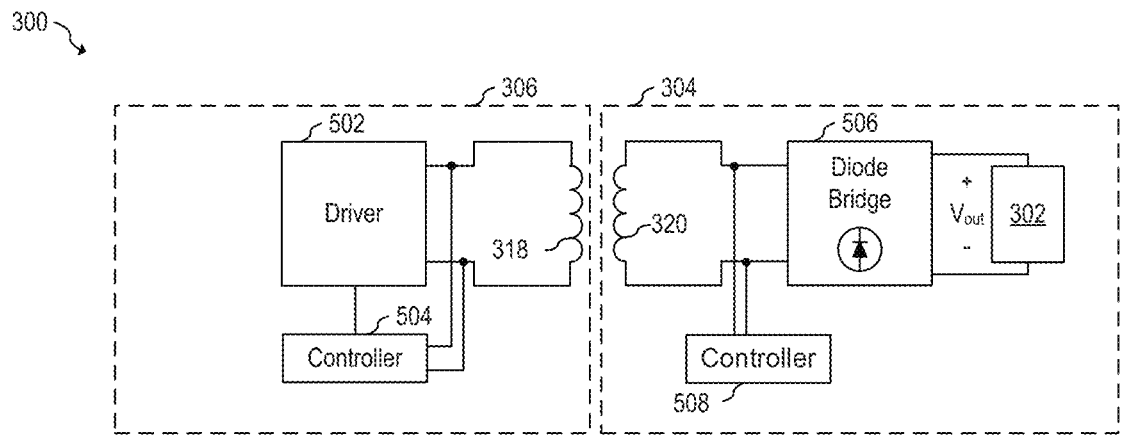
FIG. 5 shows a schematic diagram of the wireless power transmission system of FIG. 3, according to an embodiment of the present invention.

FIG. 5 shows a schematic diagram of wireless power transmission system 300, according to an embodiment of the present invention. As shown in FIG. 5, wireless power transmitter 306 includes driver 502 and controller 504, and wireless power receiver 304 includes diode bridge rectifier 506 and controller 508.

During normal operation, driver 502 produces an alternating voltage across coil 318, e.g., at a frequency between 80 kHz and 300 kHz. The current flowing through coil 318 induces a corresponding current that flows through coil 320, thereby, causing the wireless transfer of power. The current flowing through coil 320 produces a voltage across coil 320 that is rectified by diode bridge rectifier 506 and supplied to a load, such as 5G cell 302. In some embodiments, the rectified voltage may be 24 V. Other voltages, such as lower than 24 V, such as 20 V, 18 V, 12 V or lower, or higher than 24 V, such as 25 V, 28 V, or higher, are also possible.

Driver 502 may be implemented in any way known in the art. For example, in some embodiments, driver 502 may be implemented with a half bridge. In other embodiments, a full bridge may be used. In some embodiments, driver 502 may be implemented as a class-D amplifier or a class-E amplifier. Other implementations are also possible.

Diode bridge rectifier 506 may be implemented in any way known in the art. Other rectification methods may also be used. For example, in some embodiments, a synchronous rectifier may be used.

Controller 504 may be implemented in any way known in the art. For example, some embodiments may implement controller 504 with a general purpose controller. Other embodiments may implement controller 504 using a digital signal processor (DSP) or a field programmable gate array (FPGA). Yet other embodiments may implement controller 504 using custom logic, such as an application-specific integrated circuit (ASIC). Other implementations are also possible.

Controller 508 may be implemented in any way known in the art. For example, some embodiments may implement controller 508 with a general purpose controller. Other embodiments may implement controller 508 using a digital signal processor (DSP) or a field programmable gate array (FPGA). Yet other embodiments may implement controller 508 using custom logic, such as an application-specific integrated circuit (ASIC). Other implementations are also possible.

Controller 508 includes a first measurement circuit, such as an analog circuit (e.g., a differential amplifier) or an analog-to-digital converter (ADC) coupled to terminals of coil 320 and capable of performing measurements of the voltage across coil 320. Controller 508 also includes a load modulation circuit capable of modulating the voltage across 320 to induce a corresponding modulation across coil 318 to transmit data from wireless power receiver 304 to wireless power transmitter 306.

Controller 504 includes a second measurement circuit capable of detect the voltage modulation induced by controller 504 so that controller 504 receives the data from controller 504.

Figure 6:
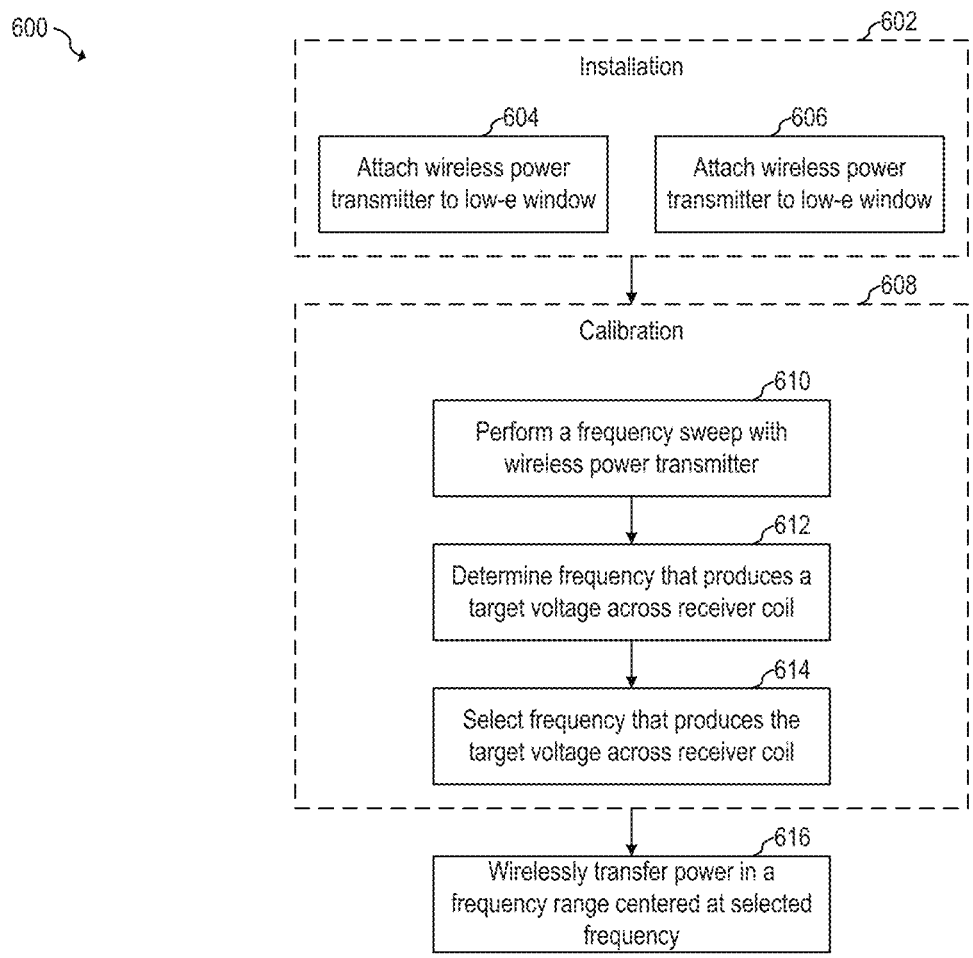
FIG. 6 shows a flow chart of embodiment method of operating a wireless power transmitter, according to an embodiment of the present invention.

Controller 504 is configured to set the operating frequency of driver 502 such that the power wireless transfer generates a desired target voltage across coil 320 while operating away from the resonance frequency of the wireless power transmission system 300. For example, FIG. 6 shows a flow chart of embodiment method of operating wireless power transmitter 306, according to an embodiment of the present invention.

During step 602, a wireless power transmission system, such as wireless power transmission system 300 is installed. Step 602 includes steps 604 and 606.

During step 604, a wireless power transmitter, such as wireless power transmitter 306 is attached to a low-e window, such as low-e window 310. In some embodiments, the wireless power transmitter is attached magnetically to the low-e window. In some embodiments, the wireless power transmitter is glued to the low-e window. Other methods may be used to attach wireless power transmitter to the low-e window.

During step 606, a wireless power receiver, such as wireless power receiver 304 is attached to a low-e window, such as low-e window 310. In some embodiments, the wireless power receiver is inside an electronic device, such as 5G cell 302. In some embodiments, the wireless power receiver and/or corresponding electronic device is attached magnetically to the low-e window. In some embodiments, the wireless power receiver and/or corresponding electronic device is glued to the low-e window. Other methods may be used to attach wireless power receiver and/or corresponding electronic device to the low-e window.

During step 608, a calibration of the wireless power transmitter is performed to set the operating frequency. Step 608 includes steps 610, 612, 614, and 616.

During step 610, the wireless power transmitter performs a frequency sweep across an operating frequency range that does not include the resonance frequency of the wireless power transmission system. In some embodiments, controller 504 performs the frequency sweep by controlling driver 502.

In some embodiments, the frequency sweep is performed by linearly ramping (up or down) the frequency in, e.g., predetermined frequency steps from a starting frequency to an ending frequency (e.g., from 100 kHz to 148 kHz, where the resonance frequency of the wireless power transfer system is, e.g., lower than 148.5 kHz). Other methods for frequency sweep may be used.

For each frequency step during the frequency sweep, the wireless power transmitter determines a voltage produces across a receiver coil, such as coil 320. For example, in some embodiments, controller 508 measures the voltage across coil 320 and transmit the measured value to controller 504 using load modulation. The wireless power transmitter (e.g., via controller 504) then determines the frequency that produces a target voltage across the receiver coil during step 612.

During step 614, the wireless power transmitter (e.g., via controller 504) selects as the operating frequency of the wireless power transmitter the frequency that produced a voltage across the receiver coil that is closest to the target voltage.

During step 616, the wireless power transmitter wirelessly transmit power in a frequency range centered at the selected frequency. By operating the wireless power transmitter at a frequency away from the resonance, fluctuation in the voltage across coil 320 caused by a shift in resonance frequency are advantageously minimized. For example, FIG. 7 shows a graph of wireless power transfer versus frequency that shows the magnitude of wireless power shift of wireless power transmission system when operating at resonance ($f_1$) and off-resonance ($f_2$).

Figure 7:
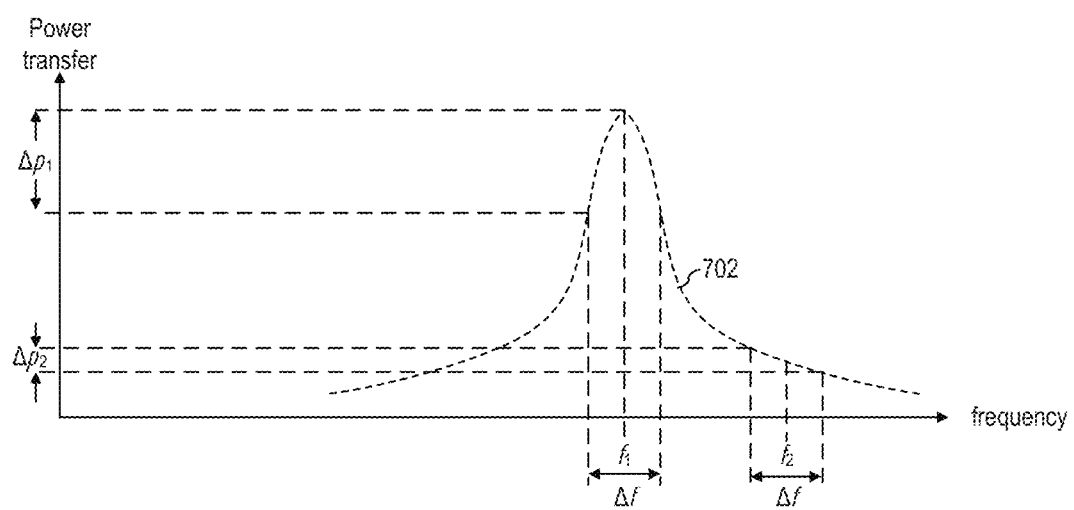
FIG. 7 shows a graph of wireless power transfer versus frequency that shows the magnitude of wireless power shift when operating a wireless power transmission system at resonance and off-resonance.

As shown in FIG. 7, the magnitude of the shift in power $\Delta p_2$ when operating off-resonance (at frequency $f_2$) is lower than the magnitude of the shift in power $\Delta p_1$ when operating at resonance (at frequency $f_1$), where the shift in power is caused by a shift in resonance frequency.

Operating the wireless power transmitter off-resonance advantageously allows for more accurate control of the magnitude of power transfer, and therefore the magnitude of the voltage across coil 320 when compared with driving the wireless power transmitter at or near the resonance frequency.

Some embodiments, when operating off-resonance and using an inductive wireless power transmitter, such as wireless power transmitter 306, at a distance of 30 mm from a wireless power receiver, such as wireless power receiver 304, have advantageously achieved a wireless power transfer efficiency greater than 85% when transferring power through a low-e window at a frequency located between 100 kHz and 148.5 kHz.

Example embodiments of the present invention are summarized here. Other embodiments can also be understood from the entirety of the specification and the claims filed herein.

Example 1

A method for wirelessly transferring power through a low-e window, the method including: causing a first current to flow through a transmitter coil disposed in a first outer surface of the low-e window, the first current having a first frequency; inducing, with the first current, a second current to flow through a receiver coil disposed in a second outer surface of the low-e window, the low-e window having a metal or metal oxide layer having a first thickness; generating a voltage based on the second current; and powering an electronic device coupled to the receiver coil with the generated voltage, where the first frequency is associated with a first skin depth of the metal or metal oxide layer, and where the first skin depth is larger than the first thickness.

Example 2

The method of example 1, where the low-e window includes a first pane having an inner surface and an outer surface, a second pane opposite the first pane, the second pane having an inner surface and an outer surface, and a gas trapped between the inner surfaces of the first and second panes, where the first outer surface is the outer surface of the first pane, where the second outer surface is the outer surface of the second pane, where the second pane includes the metal or metal oxide layer.

Example 3

The method of one of examples 1 or 2, where the first frequency is between 80 kHz and 300 kHz, inclusive.

Example 4

The method of one of examples 1 to 3, where the first frequency is between 100 kHz and 148.5 kHz, inclusive.

Example 5

The method of one of examples 1 to 4, where the first thickness is about 5 μm.

Example 6

The method of one of examples 1 to 5, where the first skin depth is at least 7 times larger than the first thickness.

Example 7

The method of one of examples 1 to 6, where a distance between the transmitter coil and the receiver coil is at least 30 mm.

Example 8

The method of one of examples 1 to 7, further including calibrating a power transfer from the transmitter coil to the receiver coil, where the calibrating includes: performing a frequency sweep of the first current with a wireless power transmitter that includes the transmitter coil; and determining a second frequency of the first current that causes a predetermined voltage across the receiver coil based on the frequency sweep, where the first frequency is based on the second frequency.

Example 9

The method of one of examples 1 to 8, where the first frequency is equal to the second frequency.

Example 10

The method of one of examples 1 to 9, further including attaching a wireless power transmitter to the low-e window with magnets, the wireless power transmitter including the transmitter coil.

Example 11

The method of one of examples 1 to 10, further including attaching a wireless power transmitter to the low-e window with adhesive, the wireless power transmitter including the transmitter coil.

Example 12

The method of one of examples 1 to 11, where the electronic device is a 5G cell that operates in the millimeter-wave frequency range, and where the low-e window is on a building separating the inside of the building from the outside of the building, the 5G cell disposed on the outside of the building, the method further including providing Internet to the inside of the building with the 5G cell.

Example 13

The method of one of examples 1 to 12, where providing Internet to the inside of the building includes providing Internet to the inside of the building via WiFi.

Example 14

The method of one of examples 1 to 13, where the transmitter coil is included in a wireless power transmitter disposed on the inside of the building, the method further including receiving WiFi data from the 5G cell with the wireless power transmitter.

Example 15

A wireless power transmission system including: a low-e window having a first pane, and a second pane opposite the first pane, the second pane having a metal or metal oxide layer of a first thickness; a wireless power transmitter having a transmitter coil disposed in the first pane; and a wireless power receiver having a receiver coil disposed in the second pane, where the wireless power transmitter is configured to wirelessly transfer power through the low-e window to induce a second current flowing through the receiver coil by causing a first current to flow through the transmitter coil at a first frequency, where the first frequency is associated with a first skin depth of the metal or metal oxide layer, and where the first skin depth is larger than the first thickness.

Example 16

The system of example 15, where the transmitter coil has an inductance between 8 µH and 16 µH, inclusive, and where the receiver coil has an inductance between 32 µH and 80 µH, inclusive.

Example 17

The system of one of examples 15 or 16, where the first frequency is between 100 kHz and 148.5 kHz, inclusive.

Example 18

The system of one of examples 15 to 17, where the first skin depth is at least 7 times larger than the first thickness.

Example 19

The system of one of examples 15 to 18, where the first skin depth is at least 1000 times larger than the first thickness.

Example 20

A wireless power transmitter configured to be coupled to a low-e window that includes a metal or metal oxide layer having a first thickness, and a wireless power receiver having a receiver coil disposed in an outer surface of a second pane of the low-e window, the wireless power transmitter including: a driver; and a transmitter coil coupled to the driver and configured to be disposed in an outer surface of a first pane of the low-e window, the wireless power transmitter configured to transmit power to the wireless power receiver through the low-e window by causing the driver to induce a second current flowing through the receiver coil by generating a first current flowing through the transmitter coil, the first current having a first frequency, where the first frequency is associated with a first skin depth of the metal or metal oxide layer, and where the first skin depth is larger than the first thickness.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wirelessly transferring power through a low-e window, the method comprising:
   causing a first current to flow through a transmitter coil disposed in a first outer surface of the low-e window, the first current having a first frequency;
   inducing, with the first current, a second current to flow through a receiver coil disposed in a second outer surface of the low-e window, the low-e window having a metal or metal oxide layer having a first thickness;
   generating a voltage based on the second current; and
   powering an electronic device coupled to the receiver coil with the generated voltage, wherein the first frequency is associated with a first skin depth of the metal or metal oxide layer, and wherein the first skin depth is larger than the first thickness.

2. The method of claim 1, wherein the low-e window comprises a first pane having an inner surface and an outer surface, a second pane opposite the first pane, the second pane having an inner surface and an outer surface, and a gas trapped between the inner surfaces of the first and second panes, wherein the first outer surface is the outer surface of the first pane, wherein the second outer surface is the outer surface of the second pane, wherein the second pane comprises the metal or metal oxide layer.

3. The method of claim 1, wherein the first frequency is between 80 kHz and 300 kHz, inclusive.

4. The method of claim 3, wherein the first frequency is between 100 kHz and 148.5 kHz, inclusive.

5. The method of claim 1, wherein the first thickness is about 5 µm.

6. The method of claim 1, wherein the first skin depth is at least 7 times larger than the first thickness.

7. The method of claim 1, wherein a distance between the transmitter coil and the receiver coil is at least 30 mm.

8. The method of claim 1, further comprising calibrating a power transfer from the transmitter coil to the receiver coil, wherein the calibrating comprises:
performing a frequency sweep of the first current with a wireless power transmitter that comprises the transmitter coil; and
determining a second frequency of the first current that causes a predetermined voltage across the receiver coil based on the frequency sweep, wherein the first frequency is based on the second frequency.

9. The method of claim 8, wherein the first frequency is equal to the second frequency.

10. The method of claim 1, further comprising attaching a wireless power transmitter to the low-e window with magnets, the wireless power transmitter comprising the transmitter coil.

11. The method of claim 1, further comprising attaching a wireless power transmitter to the low-e window with adhesive, the wireless power transmitter comprising the transmitter coil.

12. The method of claim 1, wherein the electronic device is a 5G cell that operates in the millimeter-wave frequency range, and wherein the low-e window is on a building separating the inside of the building from the outside of the building, the 5G cell disposed on the outside of the building, the method further comprising providing Internet to the inside of the building with the 5G cell.

13. The method of claim 12, wherein providing Internet to the inside of the building comprises providing Internet to the inside of the building via WiFi.

14. The method of claim 13, wherein the transmitter coil is comprised in a wireless power transmitter disposed on the inside of the building, the method further comprising receiving WiFi data from the 5G cell with the wireless power transmitter.

15. A wireless power transmission system comprising:
a low-e window having a first pane, and a second pane opposite the first pane, the second pane having a metal or metal oxide layer of a first thickness;
a wireless power transmitter having a transmitter coil disposed in the first pane; and
a wireless power receiver having a receiver coil disposed in the second pane, wherein the wireless power transmitter is configured to wirelessly transfer power through the low-e window to induce a second current flowing through the receiver coil by causing a first current to flow through the transmitter coil at a first frequency, wherein the first frequency is associated with a first skin depth of the metal or metal oxide layer, and wherein the first skin depth is larger than the first thickness.

16. The system of claim 15, wherein the transmitter coil has an inductance between 8 µH and 16 µH, inclusive, and wherein the receiver coil has an inductance between 32 µH and 80 µH, inclusive.

17. The system of claim 15, wherein the first frequency is between 100 kHz and 148.5 kHz, inclusive.

18. The system of claim 15, wherein the first skin depth is at least 7 times larger than the first thickness.

19. The system of claim 18, wherein the first skin depth is at least 1000 times larger than the first thickness.

20. A wireless power transmitter configured to be coupled to a low-e window that comprises a metal or metal oxide layer having a first thickness, and a wireless power receiver having a receiver coil disposed in an outer surface of a second pane of the low-e window, the wireless power transmitter comprising:
a driver; and
a transmitter coil coupled to the driver and configured to be disposed in an outer surface of a first pane of the low-e window, the wireless power transmitter configured to transmit power to the wireless power receiver through the low-e window by causing the driver to induce a second current flowing through the receiver coil by generating a first current flowing through the transmitter coil, the first current having a first frequency, wherein the first frequency is associated with a first skin depth of the metal or metal oxide layer, and wherein the first skin depth is larger than the first thickness.

* * * * *